Oct. 19, 1926.
T. E. HEETER
1,603,281
OIL GAUGE FOR AUTOMOBILES
Filed August 29, 1921
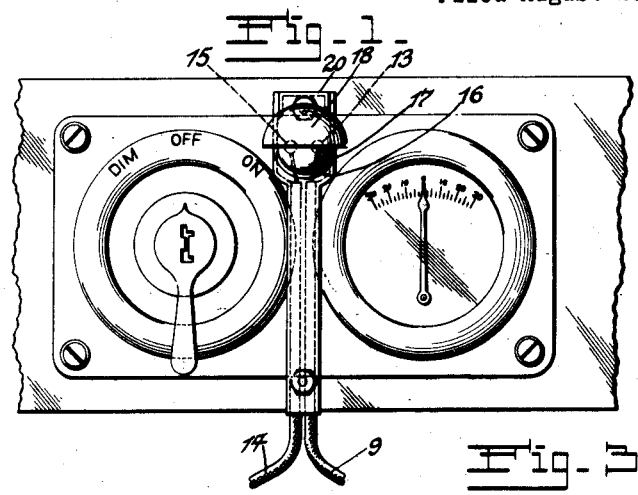
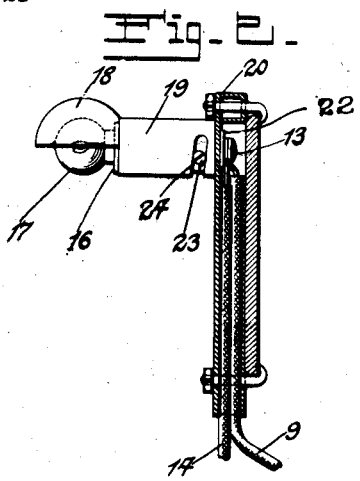
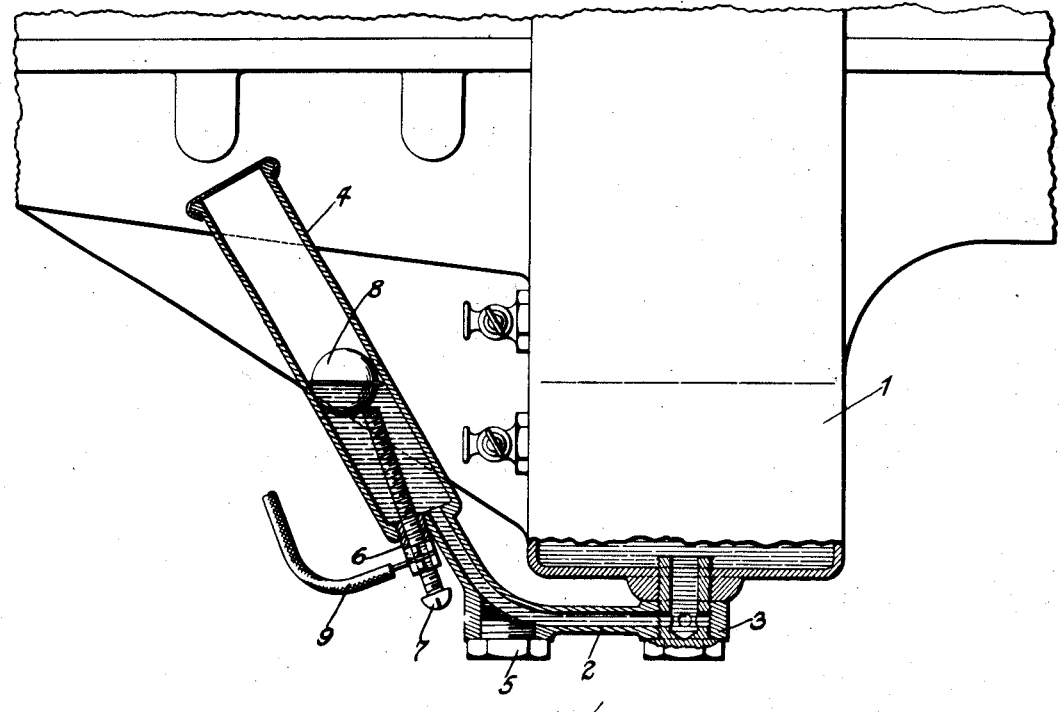
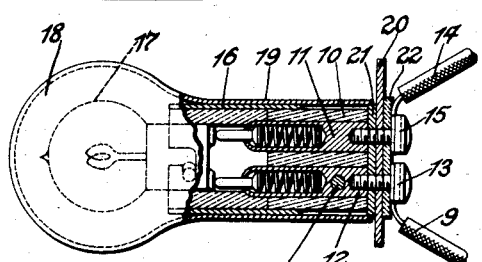
Inventor.
Thomas E. Heeter,
by Rippey Kingland
His Attorneys.

Patented Oct. 19, 1926.

1,603,281

UNITED STATES PATENT OFFICE.

THOMAS E. HEETER, OF ST. LOUIS, MISSOURI.

OIL GAUGE FOR AUTOMOBILES.

Application filed August 29, 1921. Serial No. 496,292.

This invention relates to improvements in oil gauges for automobiles, and consists in the novel construction hereinafter disclosed.

An object of the invention is to provide an oil gauge including an illuminative signal to indicate when the level of oil in the crank case falls below a predetermined level, with means for controlling the light.

The advantageous features of the construction will be apparent from the following detailed description, taken in connection with the accompanying drawing, in which—

Fig. 1 is a section of an instrument board illustrating the mounting of the illuminative signal for the gauge.

Fig. 2 is a sectional view further illustrating the construction of the illuminative signal.

Fig. 3 is a section of an automobile crank case, illustrating the means whereby the oil level is indicated.

Fig. 4 is a view partially in section of the illuminative signal of the gauge.

As illustrated in the drawing 1 indicates the crank case of an automobile engine which is provided with an oil reservoir compartment having a clean-out plug opening at the bottom. This plug in the construction shown is removed and a tube 2, having a connection 3 is mounted below the oil reservoir of the crank case, the connection 3 screwing into the usual drain opening of the reservoir. The tube 2 has a horizontal branch that develops into an inclined branch, the upper end of said inclined branch supporting at an angle a tube 4. In order to provide means for removing accumulation in the tube 2 it is formed with a hollow boss at the base of the angular branch into which is fitted a screw plug 5.

Into the bottom wall of the tube 4 and mounted in an insulated bushing 6 is a screw 7, said screw projecting into the tube 4 to a distance sufficient to make contact with a float 8 when the oil, carried in the crank case and communicated to the tube 4, has receded to a predetermined level.

Electrically connected with the screw 7 is an electrical lead 9 so that when the float 8 contacts with the inner end of the screw 7 the electrical lead 9 is grounded to complete the light circuit. Obviously, when the float 8 is elevated by the raising of the oil in the tube 4, the ground circuit from the lead 9 is open.

It will be noted that the screw 7 is adjustable and that the level at which the oil is to stand in the reservoir may be controlled by manipulation of said screw; and it will be further noted that the tube 4, which constitutes the float chamber, is in an inclined position and that the float coming in contact with the end of the screw will seat against the wall of the tube 4 forming a satisfactory ground contact.

The illuminative signal is of special construction and is preferably mounted on the instrument board so that it will be readily visible from the operator's seat and also that it may be utilized in certain adjustments for illuminating the instruments.

The light comprises a base block 10 of insulating material in which is set spring contact members 11 and 12. The electrical lead 9 is connected with the spring contact member 12 by a binding screw 13 and a lead 14 to the battery is connected with the contact member 11 by a binding screw 15. A socket member 16 for the lamp globe extends around the insulating block 10 and is adapted to receive the globe 17. Over the globe 17 is fitted a shade member 18 having a tubular extension 19 that fits over the outer surface of the socket and extends backwardly over the rear end of the base block 10. The entire lamp support is connected with a metallic plate 20, insulating washers 21 and 22 being disposed on each side of the plate to insulate the electrical connections.

On the terminal member 12 is a pin 23 that extends outwardly into a cam slot 24 formed in the wall of the tubular extension 19 of the shade member. By turning the shade member through the action of the pin and cam slot 24, the inner edge of the tubular extension 19 is brought into and out of contact with the metallic plate 20. Thus, by turning the shade to the position shown in Fig. 1 the terminal member 12 is grounded by contacting the tubular extension of the shade with the metallic plate 20, the circuit being completed through the pin 23. Normally the shade member is so adjusted that the terminal member 12 is not grounded through the plate 20, so that the circuit is responsive to the position of the float 8 in the float chamber 4. When the level of the oil in the crank case has raised sufficiently to bring the float 8 into contact with the end of the screw 7, the ground circuit through the lead 9 is completed, lighting the globe 17, thus indicating to the operator that the oil has receded to the predetermined limit.

When it is desired to use the lamp for illuminating the instruments it is only necessary to turn the shade member, the light being lighted by the grounding of the circuit as heretofore described.

I am aware that the invention may be modified in certain particulars without departing from the spirit and scope thereof. I do not limit myself therefore to exact details of construction and arrangement as shown.

What I claim and desire to secure by Letters Patent, is:—

1. A device of the character described comprising an inclined receptacle, an electric circuit terminal extending into the receptacle and being adjustable to terminate at a selected distance above the bottom of the receptacle, and a float member confined wholly within the receptacle and arranged to contact with and bridge the gap between said terminal member and one of the adjacent side walls of said receptacle.

2. In an engine having a crank case arranged to contain oil, a tube communicating with and extending laterally and obliquely upwardly from said crank case, a chamber communicating with and extending obliquely upwardly from the upper end of said tube, an electric circuit terminal member extending upwardly into said chamber and being adjustable to terminate at a selected distance above the bottom of the receptacle, and a spherical float member confined wholly within said chamber and arranged to contact with and bridge the gap between said terminal member and one of the walls of said chamber.

THOMAS E. HEETER.